March 28, 1961     I. J. HEINEN     2,977,086
GATE TYPE DUAL SEAL VALVE
Filed June 23, 1958
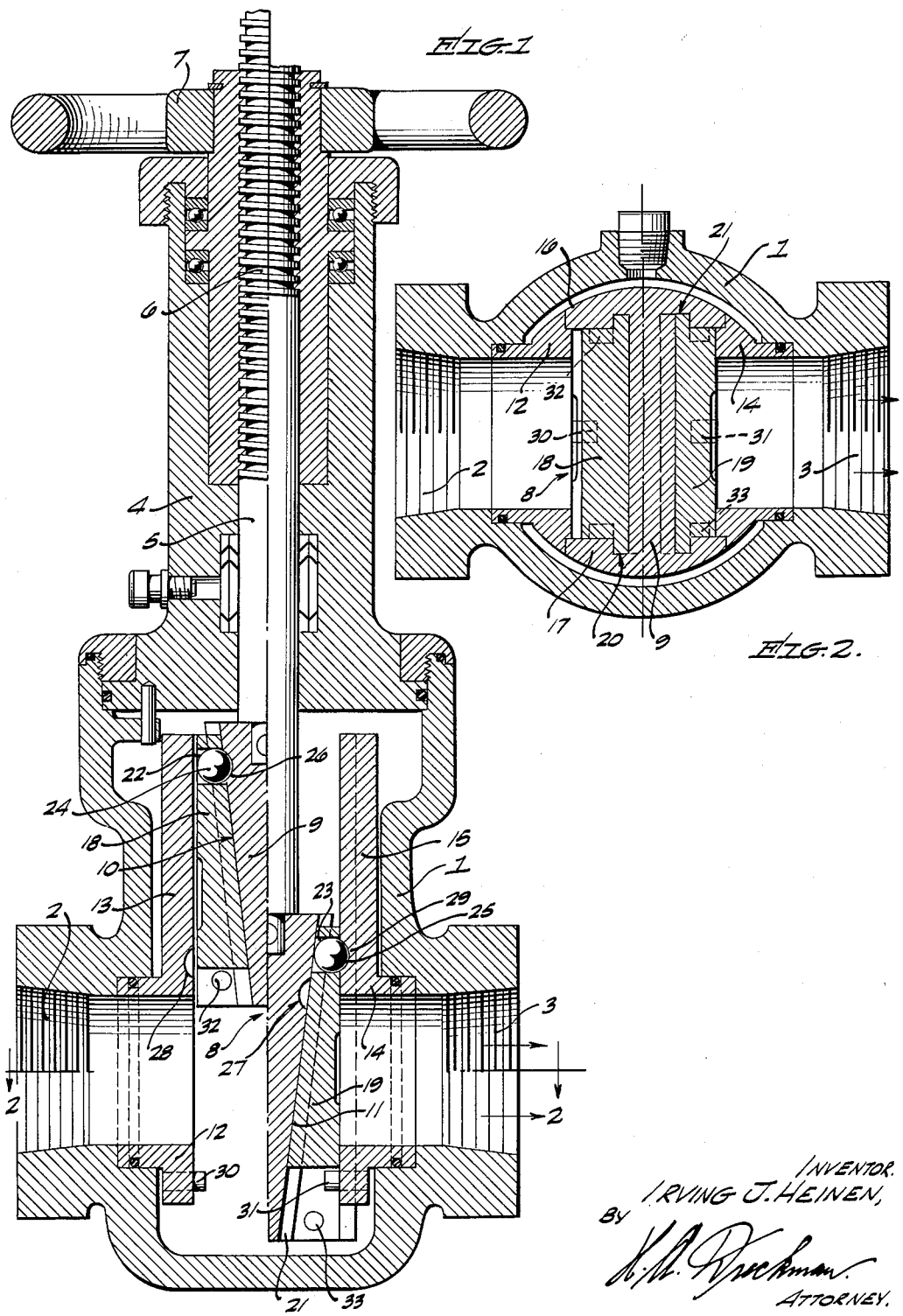
INVENTOR.
IRVING J. HEINEN,
ATTORNEY.

2,977,086
GATE TYPE DUAL SEAL VALVE
Irving J. Heinen, 2817 Cherry Ave., Long Beach, Calif.

Filed June 23, 1958, Ser. No. 743,716

3 Claims. (Cl. 251—167)

This invention relates to a gate type dual seal valve in which sealing plates are wedged against appropriate seats in the closed position of the valve to effectively seal the valve.

An object of my invention is to provide a novel dual seal valve of the gate type in which the seal seats are latched in both the raised and lowered positions thereof by means of a control ball.

Another object of my invention is to provide a novel gate type dual seal valve of the character stated, in which the seal seats are lifted in the raised position thereof by pins which project from the wedging member.

Still another object of my invention is to provide a novel gate type valve of the character stated, in which an interlocking ball is provided between the seal seats and the actuating wedge member to control the positioning of the seal seats.

Other objects, advantages and features of invention may appear from the accompanying drawing, the subjoined detailed description and the appended claims.

In the drawing:

Figure 1 is a longitudinal sectional view of my gate type dual seal valve, in which one-half of the gate is shown in raised position and the other half of the gate is shown in lowered position.

Figure 2 is a sectional view taken on line 2—2 of Fig. 1.

Referring more particularly to the drawing, it will be understood that in Figure 1 the left half of the gate and its seal seat is shown in raised position, while the right half of the gate and its sealed seat is shown in lowered or seated position. The body 1 of the valve is provided with an intake port 2 and an outlet port 3, which are substantially horizontally aligned. A head 4 is mounted on the body 1 by suitable means, and a stem 5 extends vertically through the head 4 and into the body 1, substantially as shown. The upper end of the stem 5 is threaded as shown at 6, and a control wheel 7 screws onto these threads and moves the stem 5 vertically in the body 1 for the purpose of raising and lowering the gate 8 of the valve, all of which is usual and well known in the art. The gate 8 includes a wedging member 9 which is pinned or otherwise suitably secured to the bottom of the stem 5. The wedge 9 is formed with tapered faces 10 and 11, one on each side thereof, and the purpose of these tapered faces will be subsequently described. A seat 12 is fixedly and separably mounted in the intake 2 and this seat includes an upwardly extending plate 13 which projects into the body 1. A similar seat 14 is fixedly and separably mounted in the outlet port 3 and this seat is also provided with an upwardly extending plate 15, also projecting into the body 1. The plates 13 and 15 are substantially parallel and provide a guide structure for a purpose to be further described. The wedge 9 is formed with two vertical and oppositely arranged wings 16 and 17 which fit into the seats 12 and 14 and are preferably notched into the seats, substantially as shown in Fig. 2. Thus it will be evident that the wedge 9 can be moved upwardly or downwardly in the body 1 and the wedge is accurately guided by the appropriate structure of the seats 12 and 14.

A seal seat 18 is mounted against the tapered surface 10 of the wedge 9, and a similar seal seat 19 is mounted against the tapered face 11 of the wedge 9. The seal seats 18—19 have a limited vertical movement on the wedge 9 and along the tapered surfaces 10—11, respectively. The seal seats 18—19 are held in the wedge 9 by fitting into appropriate grooves 20—21 in the wedge. The seal seats 18 and 19 are limited in their downward movement by reason of the pins 32 and 33 hereafter described, and in their upward movement they are limited by being wedged between the tapered surfaces 10 and 11 respectively, and the inner faces of the plates 13 and 15 respectively.

The seal seats 18 and 19 are controlled in their movement on the wedge 9 in the following manner: The seal seat 18 is provided with a hole 22 which extends horizontally therethrough and adjacent its upper end. The seal seat 19 has a similar horizontal hole 23 extending therethrough adjacent its upper end. A ball 24 fits in the hole 22 and a similar ball 25 fits in the hole 23. The balls are free to move inwardly and outwardly in the seal seats, and in the raised position of the wedge 9, as shown on the left side of Fig. 1, the ball 24 drops into a recess 26 in one side of the wedge 9. A similar recess 27 is provided in the other side of the wedge 9 to receive the ball 25 in one position of the parts. The plate 13 adjacent its lower end is provided with a recess 28 therein to receive the ball 24 in the lowered position of the gate, and similarly, the plate 15 is formed with a recess 29 to receive the ball 25 in the lowered position of the gate. The seat 12 is provided with an inwardly projecting pin 30 which is engaged by the lower end of the seal seat 18 and limits further downward movement of the seal seat. Similarly, the seat 14 is provided with an inwardly projecting pin 31 which is engaged by the seal seat 19 in the lowered position of this seal seat. The wedge 9 is provided with inwardly projecting pins 32 on one side thereof, and similar pins 33 on the other side thereof, which pins engage the lower faces of the seal seats 18—19, respectively, to lift the seal seats upwardly to the open position of the valve, as shown on the left side of Figure 1.

In operation

Assuming first that the valve is open, that is, the stem 5 is raised and the wedge 9 and seal seats 18—19 are in their uppermost position. In this position the balls 24 and 25 are pressed inwardly by the smooth inner surface of the plates 13 and 15 and, as a result, these balls are pressed into the recesses 26 and 27, thus coupling the seal seats to the wedge and causing the seal seats to follow the movement of the wedge.

To close the valve the stem 5 is moved downwardly, thus carrying the wedge 9 and the seal seats 18—19 downwardly until the seal seats 18—19 engage the pins 30—31 which prevents further downward movement of these seal seats. In this position the balls 24—25 can move into the recesses 28—29 as the wedge 9 continues its further downward movement. Thus the recesses 26—27 also move downward away from the balls 24—25, thus pressing the balls outwardly into the recesses 28—29, thereby coupling the seal seats 18—19 to the seats 12 and 14 and thus the seal seats 18—19 are wedged outwardly to hold them tightly against the seats 12—14 to effectively close the valve. On upward movement of the stem 5 when the valve is opened the first upward movement of the wedge 9 will retract the seal seats 18—19 until the pins 32—33 engage the bottom of the seal seats, and in this position of the parts the recesses 26—27 are again opposite the balls 24—25 and the balls can then move inwardly out of the recesses 28—29, thus permitting the seal seats 18—19 to move upwardly with the wedge 9 to open the valve.

Having described my invention, I claim:

1. A gate type dual seal valve comprising a valve body having an inlet and an outlet port therein, fixed seats separably mounted in each of said inlet and outlet ports, a vertical plate rising from each of said seats and within the body, a stem extending into said body and a wedge on the lower end of said stem, said wedge having tapered surfaces thereon, seal seats, means mounting the seal seats on said wedge surfaces for limited sliding movement on the wedge, a ball mounted in each of the seal seats, said wedge having recesses therein to receive a portion of the balls in one position of the parts and couple the seal seats to the wedge, each of said first named seats having a recess therein to receive said balls in another position of the parts to releasably couple the seal seats to the first named seats.

2. A gate type dual seal valve comprising a valve body having an inlet and an outlet port therein, fixed seats separably mounted in each of said inlet and outlet ports, a vertical plate rising from each of said seats and within the body, a stem extending into said body and a wedge on the lower end of said stem, said wedge having tapered surfaces thereon, seal seats, means mounting the seal seats on said wedge surfaces for limited sliding movement on the wedge, a ball mounted in each of the seal seats, said wedge having recesses therein to receive a portion of the balls in one position of the parts and couple the seal seats to the wedge, each of said first named seats having a recess therein to receive said balls in another position of the parts to releasably couple the seal seats to the first named seats, a pin projecting from each of the first named seats and engageable by the seal seats to limit downward movement of the seal seats.

3. A gate type dual seal valve comprising a valve body having an inlet and an outlet port therein, fixed seats separably mounted in each of said inlet and outlet ports, a vertical plate rising from each of said seats and within the body, a stem extending into said body and a wedge on the lower end of said stem, said wedge having tapered surfaces thereon, seal seats, means mounting the seal seats on said wedge surfaces for limited sliding movement on the wedge, a ball mounted in each of the seal seats, said wedge having recesses therein to receive a portion of the balls in one position of the parts and couple the seal seats to the wedge, each of said first named seats having a recess therein to receive said balls in another position of the parts to releasably couple the seal seats to the first named seats, a pin projecting from each of the first named seats and engageable by the seal seats to limit downward movement of the seal seats, a pin on the wedge engageable with the seal seats to lift said seal seats on upward movement of the wedge.

References Cited in the file of this patent

UNITED STATES PATENTS

| | | |
|---|---|---|
| 890,609 | Coleman | June 16, 1908 |
| 1,136,841 | Shaw | Apr. 20, 1915 |
| 1,647,734 | Kelly | Nov. 1, 1927 |
| 1,650,969 | Thoman | Nov. 29, 1927 |
| 2,406,099 | Penick | Aug. 20, 1946 |
| 2,858,097 | Blomstran | Oct. 28, 1958 |

FOREIGN PATENTS

| | | |
|---|---|---|
| 312,615 | Great Britain | May 27, 1929 |
| 652,488 | Germany | Nov. 1, 1937 |